US012587448B2

(12) United States Patent
Vasseur et al.

(10) Patent No.: US 12,587,448 B2
(45) Date of Patent: Mar. 24, 2026

(54) AI-BASED NETWORK TROUBLESHOOTING WITH EXPERT FEEDBACK

(71) Applicant: Cisco Technology, Inc., San Jose, CA (US)

(72) Inventors: Jean-Philippe Vasseur, Combloux (FR); Grégory Mermoud, Venthône (CH); Pierre-André Savalle, Rueil-Malmaison (FR); Eduard Schornig, Haarlem (NL)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 18/386,826

(22) Filed: Nov. 3, 2023

(65) Prior Publication Data

US 2025/0150357 A1 May 8, 2025

(51) Int. Cl.
*H04L 41/16* (2022.01)
*G10L 15/22* (2006.01)

(52) U.S. Cl.
CPC .............. *H04L 41/16* (2013.01); *G10L 15/22* (2013.01)

(58) Field of Classification Search
CPC ..... H04L 41/16; H04L 41/145; H04L 41/147; H04L 63/1425; H04L 41/142; H04L 41/0631; H04L 41/0893; H04L 51/046;

G10L 15/1815; G06N 3/045; G06N 3/0455; G06N 3/047; G06N 3/0475; H04M 3/5175; H04M 3/5166; H04M 2203/401
See application file for complete search history.

(56) References Cited

U.S. PATENT DOCUMENTS

| | | | |
|---|---|---|---|
| 11,916,767 B1 * | 2/2024 | Wu | .......................... H04L 43/04 |
| 2018/0020094 A1 | 1/2018 | Marrelli et al. | |
| 2018/0075368 A1 | 3/2018 | Brennan et al. | |
| 2020/0394360 A1 * | 12/2020 | Dunn | ...................... G06N 3/045 |
| 2022/0309250 A1 * | 9/2022 | Das | ........................ G06F 40/284 |
| 2023/0259821 A1 * | 8/2023 | Travalini | ............. G06N 3/0455 |
| | | | 706/12 |
| 2024/0176958 A1 * | 5/2024 | Raimondo | ........... G06N 3/0455 |
| 2024/0427631 A1 * | 12/2024 | Corlatescu | ................ G06F 9/54 |
| 2025/0053793 A1 * | 2/2025 | Liu | ......................... G06N 3/092 |
| 2025/0063140 A1 * | 2/2025 | Grillo | ...................... G06F 40/30 |
| 2025/0132968 A1 * | 4/2025 | Schornig | ............... H04L 41/145 |
| 2025/0139411 A1 * | 5/2025 | Murthy | ................ G06N 3/0455 |

FOREIGN PATENT DOCUMENTS

WO 2019203779 A1 10/2019

* cited by examiner

*Primary Examiner* — Yogeshkumar Patel
(74) *Attorney, Agent, or Firm* — Lee & Hayes, P.C.

(57) ABSTRACT

In one implementation, a device uses a large language model-based agent to identify a task to correct an issue in a network. The device makes a determination that the large language model-based agent cannot complete the task. The device identifies, based on the determination, a subject matter expert to help complete the task. The device sends a request to the subject matter expert to complete the task.

20 Claims, 12 Drawing Sheets

Figures 5A, 5B:
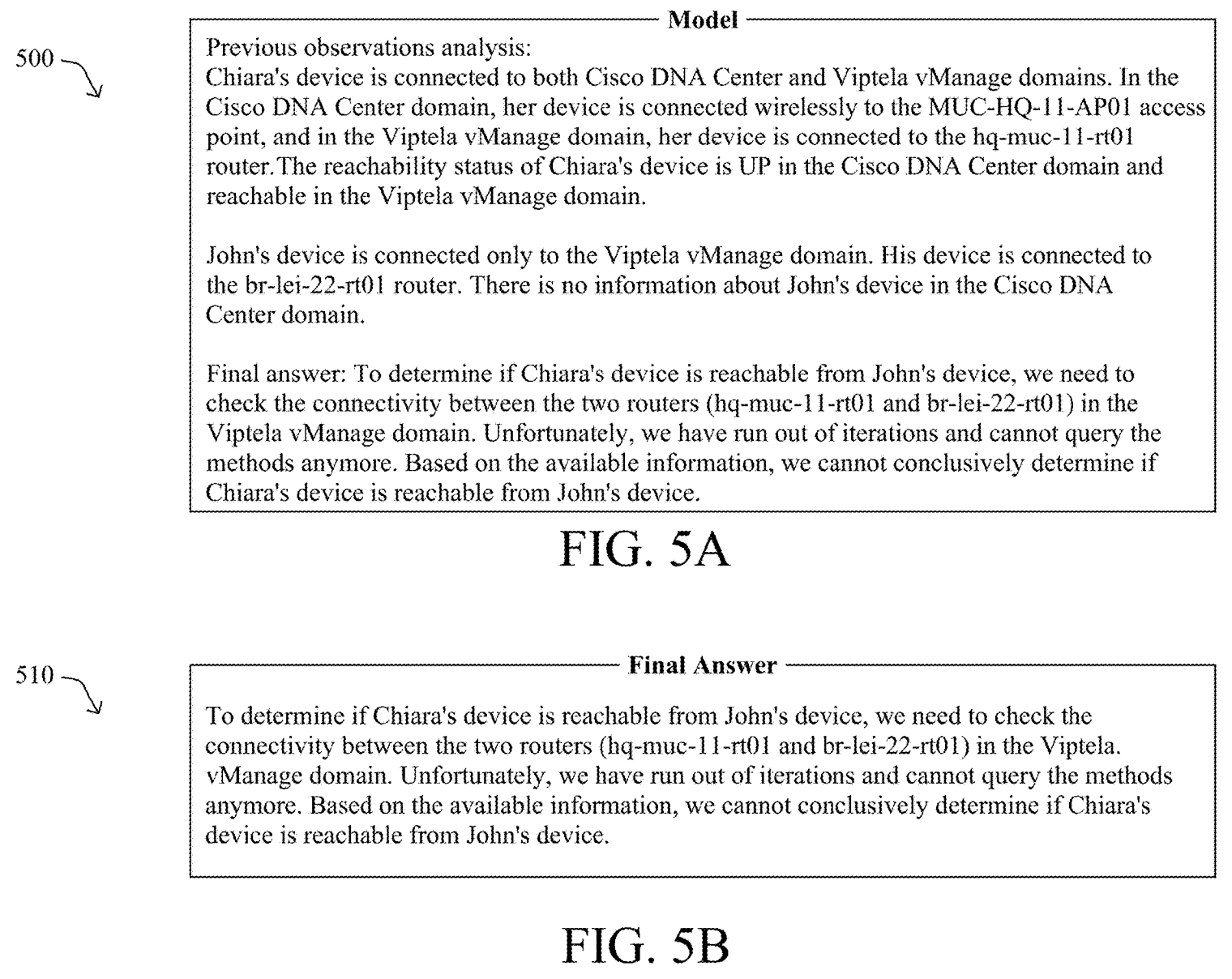

—— Model ——

Previous observations analysis:
Chiara's device is connected to both Cisco DNA Center and Viptela vManage domains. In the Cisco DNA Center domain, her device is connected wirelessly to the MUC-HQ-11-AP01 access point, and in the Viptela vManage domain, her device is connected to the hq-muc-11-rt01 router. The reachability status of Chiara's device is UP in the Cisco DNA Center domain and reachable in the Viptela vManage domain.

John's device is connected only to the Viptela vManage domain. His device is connected to the br-lei-22-rt01 router. There is no information about John's device in the Cisco DNA Center domain.

Final answer: To determine if Chiara's device is reachable from John's device, we need to check the connectivity between the two routers (hq-muc-11-rt01 and br-lei-22-rt01) in the Viptela vManage domain. Unfortunately, we have run out of iterations and cannot query the methods anymore. Based on the available information, we cannot conclusively determine if Chiara's device is reachable from John's device.

—— Final Answer ——

To determine if Chiara's device is reachable from John's device, we need to check the connectivity between the two routers (hq-muc-11-rt01 and br-lei-22-rt01) in the Viptela vManage domain. Unfortunately, we have run out of iterations and cannot query the methods anymore. Based on the available information, we cannot conclusively determine if Chiara's device is reachable from John's device.

1885258, fce5d66, a1f5aud, 39e3676

————— question —————

Visualize the DNAC health score for the device
Anna is connected to for the last 3 hours.

710

5f99a3, 1d92a61, b3b1a7c, c4f36d4, 1885258, 6ab1b09, 88897a6, e8ed9ed, 6997d46, f221f72, 6ce5d66, 7943f23, f215c99, 68a37e2, b127417, 87e131a

------- action -------

Get user information including MAC address, IP address, device ID, and source controller from a given username Domain: cross-domain Parameters: -username (str): the username of the user ------- function call ------- get_user_info5fd08314b7 (username="2d")

------- observation -------

The action produced an error: try to refine your plan with simpler steps.

900

905

START

910

USE LLM-BASED AGENT TO IDENTIFY TASK
TO CORRECT NETWORK ISSUE

915

MAKE DETERMINATION THAT AGENT CANNOT COMPLETE TASK

920

IDENTIFY SME

925

SEND REQUEST FOR SME TO HELP COMPLETE TASK

930

END

AI-BASED NETWORK TROUBLESHOOTING WITH EXPERT FEEDBACK

TECHNICAL FIELD

The present disclosure relates generally to artificial intelligence (AI)-based network troubleshooting with expert feedback.

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

However, LLMs have not been used to trigger actions in self-healing networks, due to a myriad of challenges associated with their use for network monitoring and control. First, an agent flow to answer a question may require multiple steps, each of which individually can take some time. Consequently, there may be a noticeable delay in returning an answer to the original question (e.g., on the order of minutes), which can be frustrating to users. In addition, LLMs can also make mistakes which may not be apparent to a user. For example, consider the case of a model that can generate code to make an API call to list network devices, but generates an incorrect filter argument. As a result, the system may return an empty result set to the user, leading the user to believe that there were no matches to their desired criteria, when the empty results were due to the LLM using the wrong argument. Further, without any continuous learning mechanism, the LLM will continue to make the same mistakes over and over.

BRIEF DESCRIPTION OF THE DRAWINGS

The implementations herein may be better understood by referring to the following description in conjunction with the accompanying drawings in which like reference numerals indicate identically or functionally similar elements, of which:

FIGS. 5A-5B illustrate example interactions between a user and a network troubleshooting system;

DESCRIPTION OF EXAMPLE IMPLEMENTATIONS

Overview

Figure 1A:
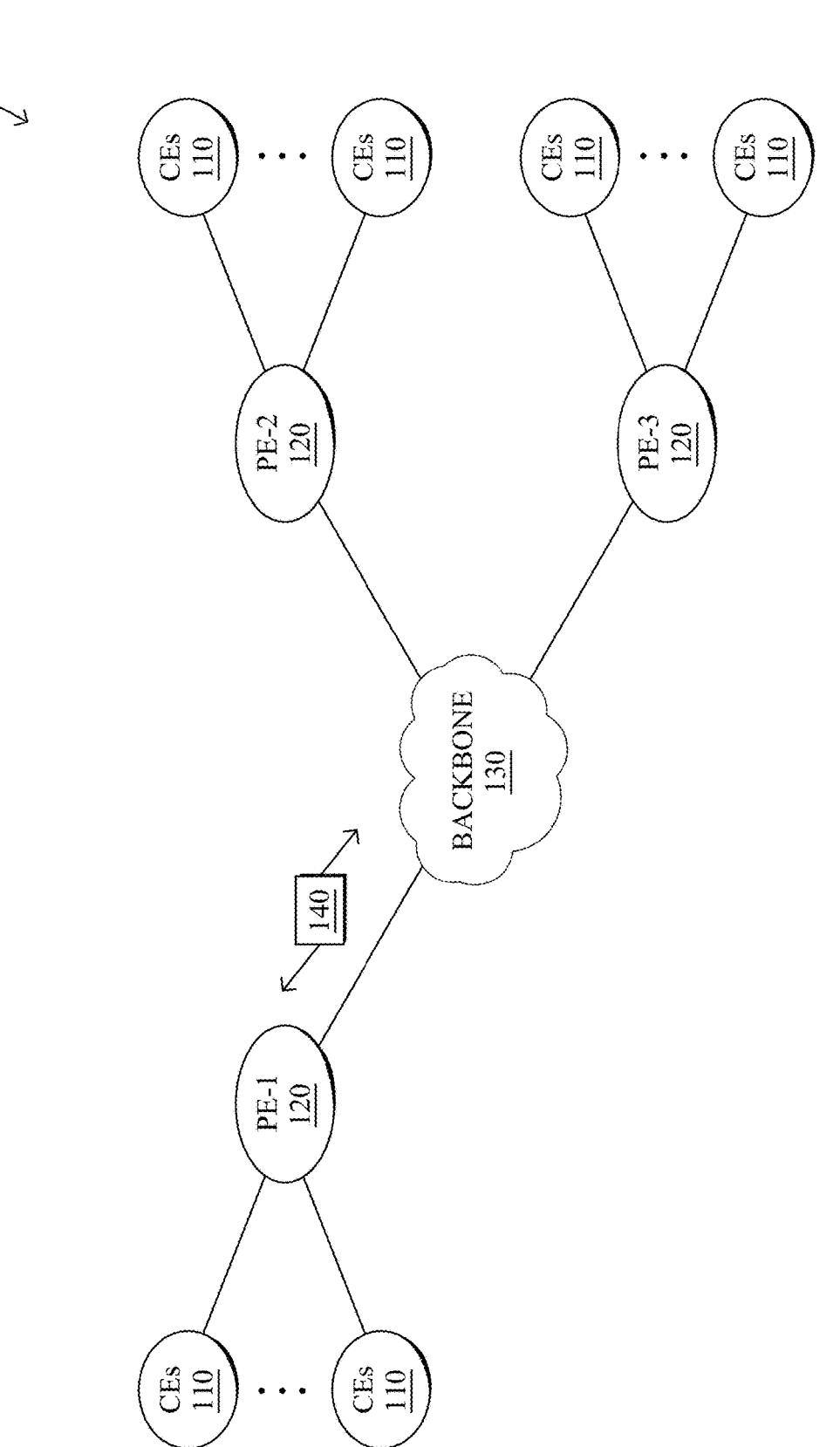
FIGS. 1A-1B illustrate an example communication network.

According to one or more implementations of the disclosure, a device uses a large language model-based agent to identify a task to correct an issue in a network. The device makes a determination that the large language model-based agent cannot complete the task. The device identifies, based on the determination, a subject matter expert to help complete the task. The device sends a request to the subject matter expert to complete the task.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
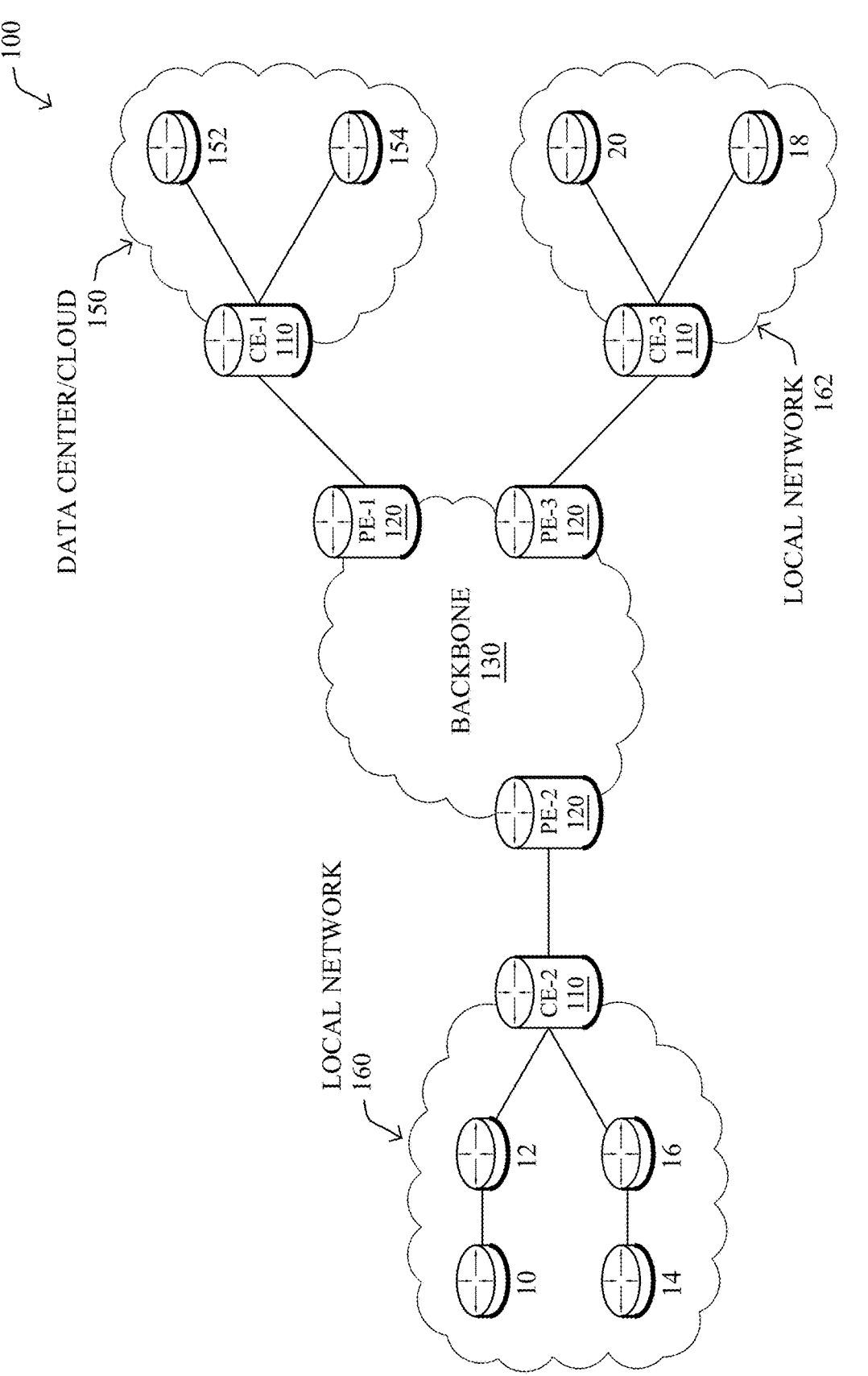

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
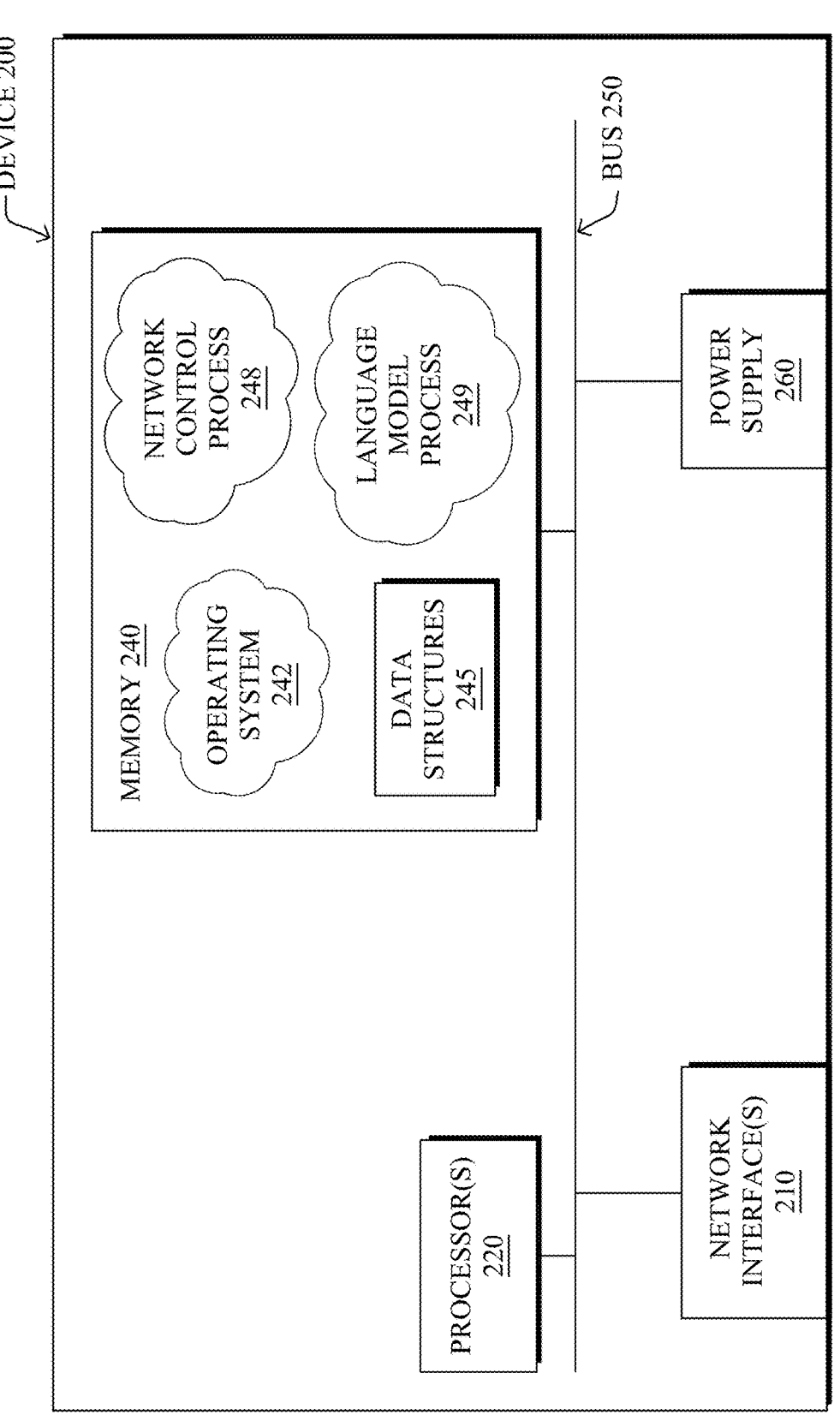
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
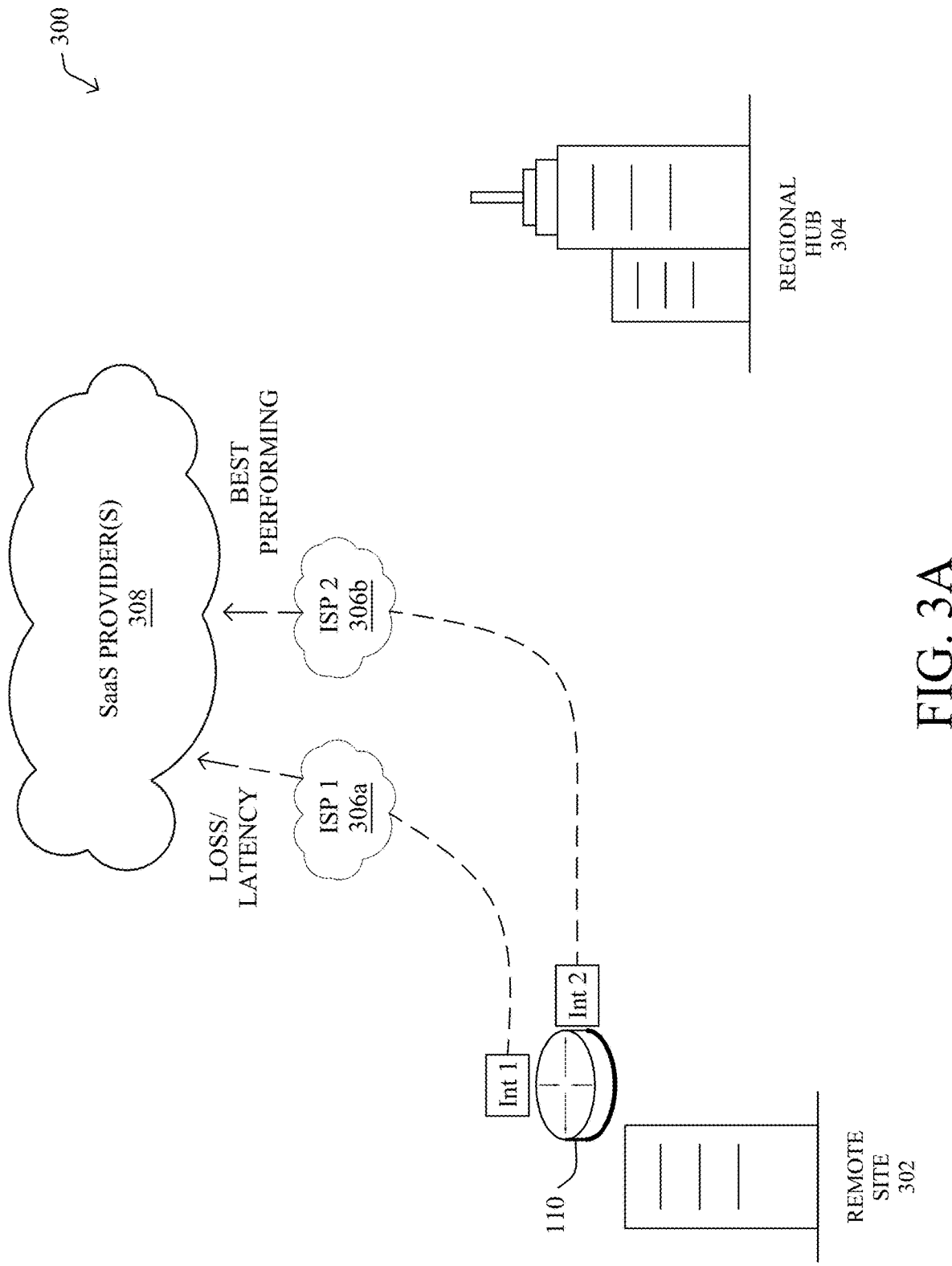
FIGS. 3A-3B illustrate example network deployments.
Figure 3B:

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
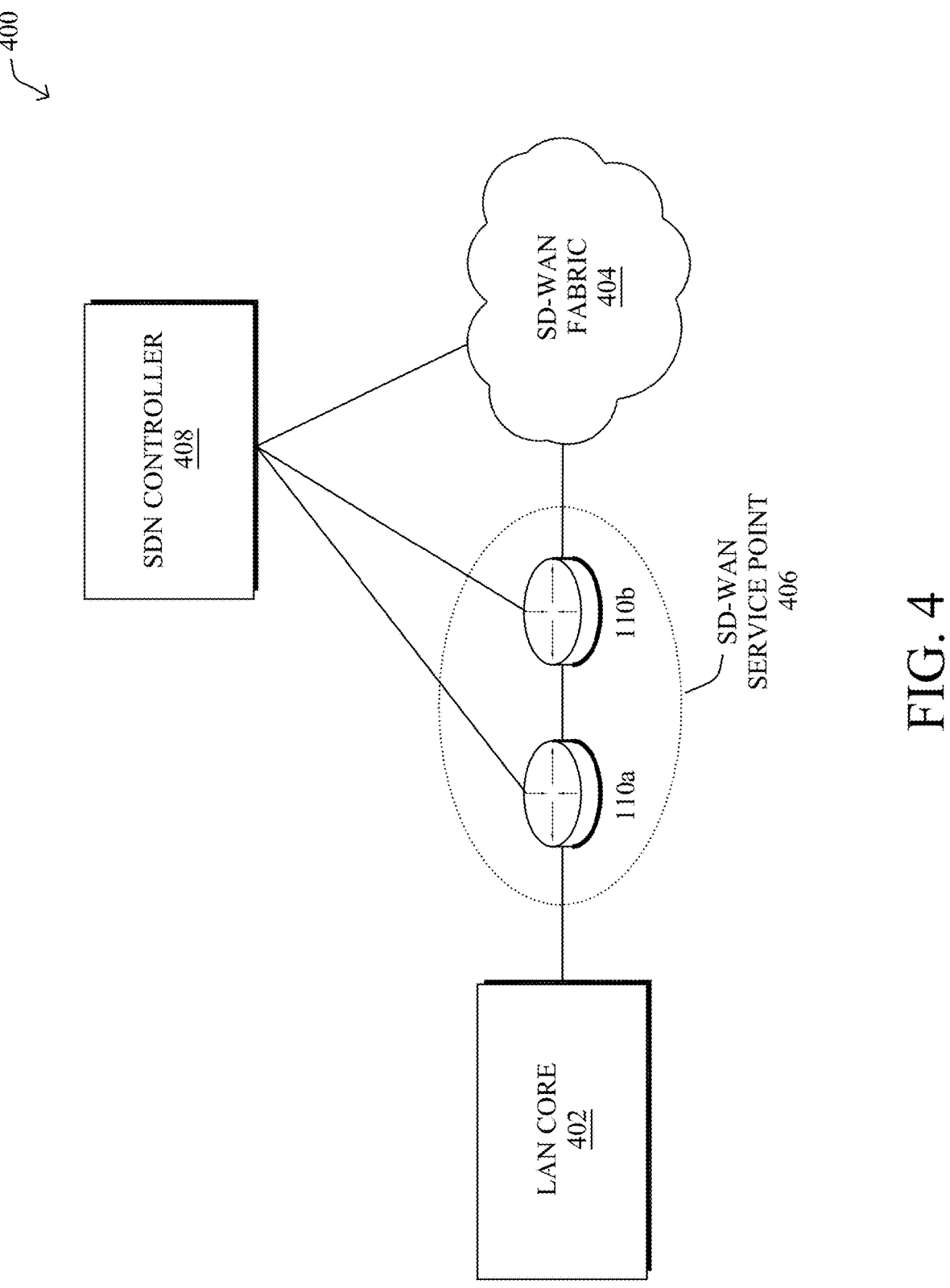
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

However, building a user-facing product from an LLM-based agent can be difficult for reasons such as the following:

An agent flow to answer a question may require multiple steps, each of which can take some time, individually. Consequently, the system may take a noticeable amount of time to provide an answer to the original question (e.g., on the order of minutes), which can be frustrating to users.

LLMs can make mistakes which may not be apparent to a user. For example, consider the case of an LLM that can generate code that calls an API to list network devices but somehow provides an incorrect filter argument to the API. When the API returns an empty result set, a user may interpret this result as meaning that no devices match their desired criteria while, in fact, the system simply called the API incorrectly. These issues can be hard to avoid due to the opaque and non-deterministic nature of LLMs, and users may quickly lose confidence in the system when faced with such issues.

Although LLMs can provide an alternative user experience by allowing a user to ask questions about a system using natural language, users often have years of familiarity with traditional web or application user interfaces. A chat bot can feel like a disconnected experience from those user interfaces, which can also be frustrating to users.

In general, an LLM-based troubleshooting agent may seek to solve a specific task T by executing a series of action $a_i$ (consisting in retrieving various information from documentation, calls to APIs, . . . ) until a satisfactory response R to the original question Q is provided to the requesting user. In such cases, let Tq refer to the trajectory for the question Q (i.e., set of action ai executed during the troubleshooting process). The response R may be correct or incorrect and, in some cases, the process may simply be stopped by the agent because the number of steps has exceeded a pre-defined thresholds $I_{max}$. Even if the LLM cannot provide the final answer after $I_{max}$ steps, the agent may request it to do its best to provide an answer which, again, may be correct or incorrect.

By way of example, FIGS. 5A-5B illustrate example interactions between a user and a network troubleshooting system, in various implementations. As shown in FIG. 5A, the LLM may perform a series of steps whose results are shown in example 500, until completing a maximum number of iterations, resulting in the final answer 510 shown in FIG. 5B that is returned to the user. As can be seen, the troubleshooting task has failed due to the model needing more iterations than currently allowed.

AI-Based Network Troubleshooting with Expert Feedback

The techniques herein allow for an AI-based network troubleshooting system to request help from Subject Matter Experts (SMEs) in order to accomplish a given task using Large Language Models (LLM). In some aspects, the techniques herein may track all actions performed during a task along with various metrics such as the percentage of successful/unsuccessful tasks per category of task. Then, the system builds a directory of SMEs that could be requested for assisting the engine during a troubleshooting process in order to get assistance (e.g., according to their success rates, responsiveness, etc., in light of the task criticality). Then, during the task processing for eligible tasks, the system may request SME assistance in order to improve the chances of success. The system may also display the status of the task and give the SME the ability to review the set of actions, flag irrelevant actions for the task, and propose new actions that can be performed on-the-fly (or offline). Irrelevant actions involved in a number of failed trajectories can then be suppressed whereas new successful actions may be added to the database, once (potentially) reviewed by experts.

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device uses a large language model-based agent to identify a task to correct an issue in a network. The device makes a determination that the large language model-based agent cannot complete the task. The device identifies, based on the determination, a subject matter expert to help complete the task. The device sends a request to the subject matter expert to complete the task.

Figure 6:
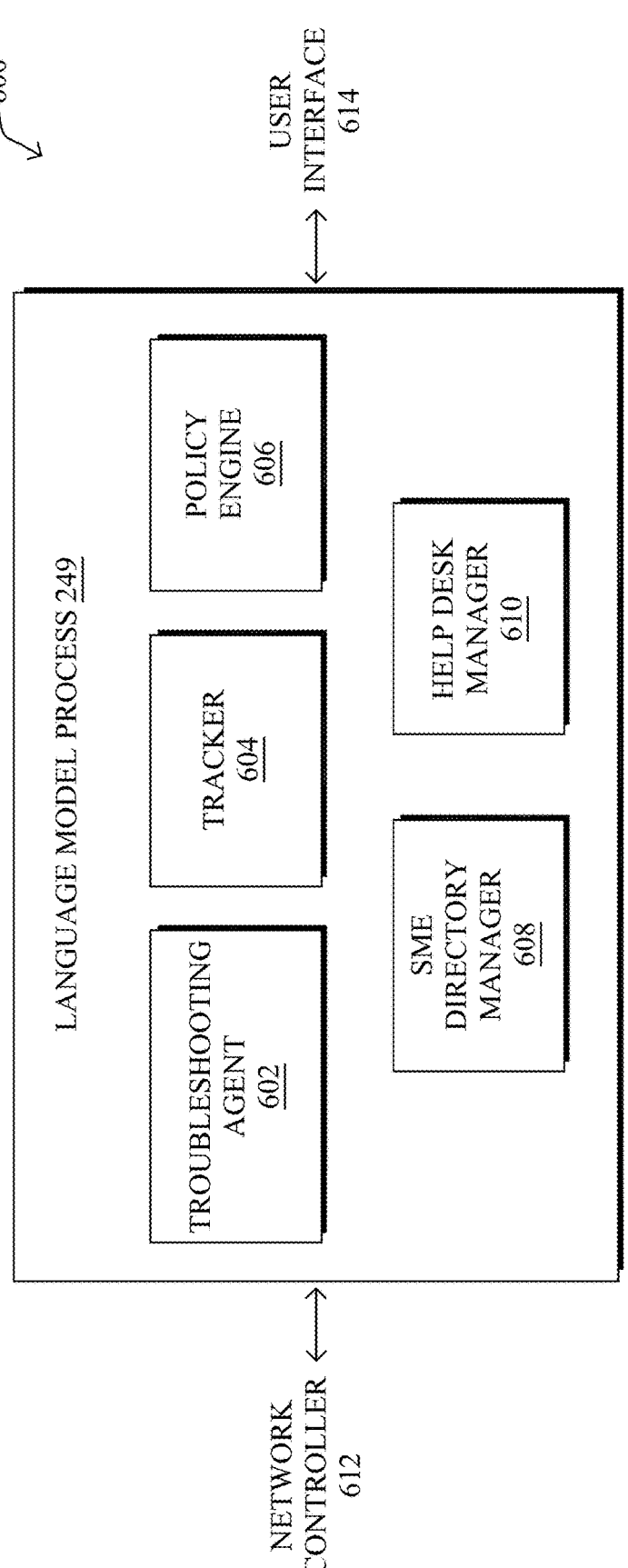
FIG. 6 illustrates an example architecture for artificial intelligence (AI)-based network troubleshooting with expert feedback.

Operationally, FIG. 6 illustrates an example architecture 600 for AI-based network troubleshooting with expert feedback, according to various implementations. At the core of architecture 600 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 612, either locally or via a network, such as via one or more application programming interfaces (APIs), etc.

As shown, language model process 249 may include any or all of the following components: a troubleshooting agent 602, a tracker 604, a policy engine 606, an SME directory manager 608, and/or a help desk manager 610. As would be appreciated, the functionalities of these components may be combined or omitted, as desired. In addition, these components may be implemented on a singular device or in a distributed manner, in which case the combination of executing devices can be viewed as their own singular device for purposes of executing language model process 249.

According to various implementations, troubleshooting agent 602 may leverage one or more LLMs to troubleshoot an issue in the network (e.g., through interaction with network controller 612, user interface 614, etc.), find the actual root cause for the issue, and/or suggest a set of one or more actions to fix the issue. Let ai denote an action used for troubleshooting an issue I and let Ai denote an action (configuration change) on the network (closed-loop control). The set of actions Ai required to solve the issue I may be determined on-the-fly by an LLM, statically determined according to a cookbook for each trajectory made of a set of action ai, or the like. For example, a static cookbook may be used to map a specific ak to set of actions Ak,l. Consider the action ak="Check the priority queue length of a router," a static set of action ak,l may be used to trigger a set of 1 action on the network (e.g., "Change the weight of the priority queue," "Modify the WRED parameter for the high priority queue"). In another implementation, the system may discover the set of required actions related to a given root cause identified thanks to a set of action ai, using reinforcement learning or another suitable approach.

If the root cause identified for issue I is eligible, troubleshooting agent 602 may perform any or all of the following:

Troubleshooting agent 602 retrieves the set of action Ai for the root cause of issue I after activating a timer T (max time to solve the issue)

Troubleshooting agent 602 may also employ various optimization criterion may be used for solving a given task T. For instance, troubleshooting agent 602 may solve some tasks with objective metrics such as reducing the processing time or improve accuracy even at the risk of involving more steps and tokens (cost). In the context of the techniques herein, the issue criticality may also drive the optimization criteria (time versus reliability versus cost). In one implementation, the optimization criteria may be unique and decided according to policy and criticality. In another implementation, troubleshooting agent 602 may trigger multiple actions in parallel, each with different optimization criterion. For example, for a given issue I, troubleshooting agent 602 may send a request to a first LLM with a first criteria (e.g., solve as quickly as possible, optimizing time) and send the same request to a second LLM with different optimization criteria (e.g., efficiency). In such a case, troubleshooting agent 602 may use the reply to the first request (set of resolution action Ai) to quickly fix the network, followed by using the second set of actions to optimize the resolution of the issue. Note that both requests may not overlap in terms of closed-loop actions, as well.

In some implementations, tracker 604 may be a separate component or a sub-component of troubleshooting agent 602 and is responsible for logging/tracking every single action ai performed by the agent during the resolution of a task T. As noted above the aim of troubleshooting agent 602 is to solve task T by executing a set of actions ai according to the instructions generated by one or more LLMs (e.g., in the form of code used to retrieve the required information to solve the task T).

For each task T, tracker 604 may log any or all of the following information:

The category of issues the task relates to (e.g. intermittent connectivity, poor connectivity, no connectivity, issues with security access, etc.). In one implementation, an LLM can be used to analyze the task requirement (text) and assign it to one of the predefined categories. When possible, tracker 604 may also record additional context such as the network domain (e.g., DNAC, SD-WAN, etc.), connection type (wired vs wireless), protocol type (e.g., BGP, OSPF, etc.).

Metadata Information: this can contain information about the user asking the question, the customer name, committed support service level agreements (SLAs), etc.

The set of trajectories Tq used to solve the task T (note: there may be more than one trajectory used to solve a given task T).

The set of action ai involved in each trajectory Tq.

The percentage of times, POSai,cat, an action ai has been involved leading to a successful trajectory (the task T was successfully solved), for a given category of task "cat" (the percentage may vary per class of task; a given action may be highly efficient for a given class of task and non-efficient for other another class).

The percentage of times, NEGai,cat, an action ai has been involved leading to a failed trajectory Tq (the task T was not solved) for a given category of task "cat."

Figure 7A:
FIGS. 7A-7B illustrate example user interfaces for an AI-Based network troubleshooting system.
Figure 7B:

By way of example, FIG. 7A illustrates an example 700 of a trajectory for task T="Visualize the DNAC health core for the device Anna is connected to for the last 3 hours" where each node represents an action with the POS and NEG (ratio) leading to successful and failed outcomes. As shown in example 710 in FIG. 7B, one can notice that the action "Get the user information including MAC address, IP address, device ID, and source controller from a given user name" was involved in a large percentage of failed trajectories.

Referring again to FIG. 6, policy engine 606 may be responsible for assessing the criticality of a given task of troubleshooting agent 602. Indeed, some tasks may be considered as non-critical (e.g., "show me the top-10 most used interfaces in the network") whereas other tasks may be much more critical (e.g., "identify the most probable root cause explaining why the server S is down"). To this end, policy engine 606 may assign a level of criticality Tc to a task T. For example, a network administrator may specify via policy engine 606 that all tasks related to lack of connectivity may be given the highest level of criticality whereas task related to performance analysis may have a lower criticality Tc. Additional criterion may be used such as the customer name (according to the contracted SLA), or the ID of the user triggering the task T.

In addition to using static rules to compute Tc, policy engine 606 could also leverage an LLM to perform sentiment analysis and determine the level of urgency for the task T. In yet another implementation, a network management system (NMS) may be used to monitor a set of network metrics that relates to the root cause identified by the troubleshooting agent 602. Policy engine 606 may then use such metrics to automatically set the criticality, accordingly.

In various implementations, SME directory manager 608 may maintain a directory of SMEs that may be called by the system during the resolution of a task T. More specifically, SME directory manager 608 may be composed of the set of SMEs that can be called during the process of solving a task T, according to the nature of the action ai and current state of the trajectory Tq, as further detailed below. To this end, SME directory manager 608 may maintain a database with any or all of the following information:

SME ID (user ID)

Schedule and working hours

Area of expertise: Networking (with sub-categories such as Wireless, WAN, DataCenter, etc.), infrastructure (access to public APIs, controllers, etc.), or the like.

Success Rate: percentage of time the SME provided help that led to a successful trajectory Tq. In some cases, an SME with low success rates may be backlisted, whereas SME with highest success rate may have higher chance of being selected (and rewarded).

Responsiveness: average (mean/ . . . ) response time of the SME.

Number of requests sent to the SME per day over the past X few days.

In various implementations, help desk manager 610 may be invoked by to trigger a call to an SME. Here, help desk manager 610 may be in charge of determining whether troubleshooting agent 602 cannot accomplish its task alone and requires SME help. A number of criteria may be used by help desk manager 610 to trigger a call to a SME listed in the database managed by SME directory manager 608 such as any or all of the following:

The budget allocated to the resolution of the task T has been exceeded. The budget may be expressed as the maximum number of actions ai executed (Tmax.). In another implementation, the maximum number of tokens allocated to solving the task T might be exceeded, or the number of times the code provided by the LLM for an action ai has exceeded a given value.

An action ai cannot be executed because resources are unavailable (e.g. API is unavailable or cannot be accessed because of insufficient level of privilege, etc.). The network administrator may decide that such specific issues should immediately trigger SME calls (e.g., to a SME with expertise related to accessing API, infrastructure, etc.).

The time elapsed for the completion of task T has exceeded the maximum tolerable value for the criticality Tc. A specific maximum task duration may be specified for each value of Tc, after the expiration of which, a call to SME may be made.

The percentage NEGai (percentage of time the action ai was involved in failed trajectory) has exceeded some hard-coded threshold. Note that the SME call may not be performed on-line (during the resolution of the task T) but off-line in order to review whether the action ai should be kept or should be removed from the database of actions because it is considered as not sufficient or leading too often to unsuccessful trajectories.

The overall efficacy (percentage of successful trajectories) for a given class of task is below a pre-defined configurable threshold.

When help desk manager 610 triggers a SME call, it may perform any of the following:

1. First, identify a SME with expertise matching the task T requirements (areas of expertise) based on the task category and context. If no SME can be found in the SME database of SME directory manager 608, then issue a custom broadcast message with a request summarizing the type of task T (nature of the problem), level of criticality along with optionally the maximum time allowed to complete the task.

2. If a SME with the required qualification can be found, then the selection of the SME is performed according to the several criteria: SME with highest success rate and/or responsiveness according to the task criticality Tc, round robin, number of past requests already sent to the SME over a given period of time, etc.

3. Once a SME has been identified, use an LLM to summarize the list of ai along with their outcomes that has been performed along the trajectory in addition to the original question. This can be done either online or offline (in batch mode). The SME may then provide feedback via a user interface with regards to the trajectory (set of actions ai). In one case, the entire trajectory may be rejected by the SME and flagged as "invalid." In another case, the SME may flag all actions ai that are valid, potentially re-ordered along with a proposed "new" action anew, which can then be executed at a given place along the trajectory. The SME may then suggest to manually run the new suggested actions and request to monitor the new trajectory (including all previously triggered actions flagged as "valid"). If a new trajectory succeeds, the SME has the ability to suggest adding anew to the action database or potentially add it to a list of new actions to be reviewed before being added to the database. Trajectories that succeed after the addition of a SME-driven new action anew are then flagged for additional review. Similarly rejected trajectories and action individually flagged as invalid are also added for manual review (such actions may be manually pruned from the list of actions in the database or with a diminished weight when retrieved using Retrieval Augmentation Generation or RETRO). Optionally, the SME may decide to create a new category for the task on the-fly should the task T have been incorrectly assigned to the wrong category of task. In yet other implementations, for tasks with high criticality, the SME may directly provide an answer to the task to the end system user.

Figure 8:
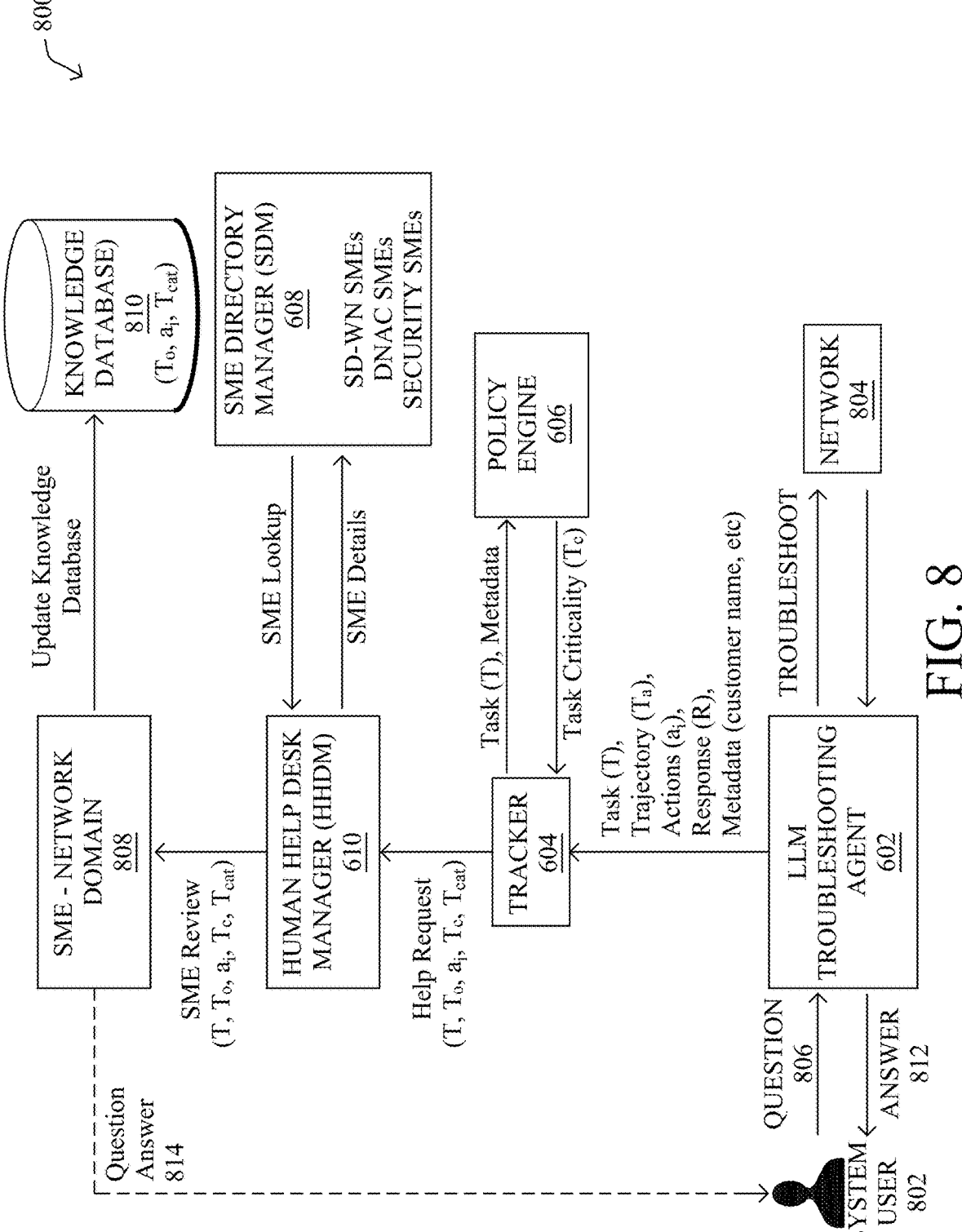
FIG. 8 illustrates an example of the interactions of the components of the architecture of FIG. 6.

FIG. 8 illustrates an example 800 of the interactions of the components of the architecture of FIG. 6, in various implementations. As shown, assume that a system user 802 issues a question 806 via a user interface regarding network 804. For instance, system user 802 may simply ask "why is my Internet connection slow?" In turn, troubleshooting agent 602 may leverage its LLM to perform troubleshooting and devise one or more corrective actions (e.g., by interfacing with a network controller and/or one or more networking devices in network 804).

However, in some instances, once troubleshooting agent 602 has completed its analysis, it may provide information to tracker 604 indicating the task, trajectory, actions, response, and/or metadata. In turn, tracker 604 may perform a lookup of the task (and its metadata) with policy engine 606, to determine the criticality of the task. Based on the criticality and/or any policies associated with the task, tracker 604 may then issue a help request to help desk manager 610 to seek the aid of an SME. Conversely, depending on the resulting task, trajectory, actions, criticality, etc., troubleshooting agent 602 may simply attempt to correct the issue, automatically, and/or return an answer 812 back to system user 802.

Help desk manager 610 may perform a lookup of SMEs via SME directory manager 608, to identify one or more SMEs to request help regarding the task. In turn, help desk manager 610 may send a review request to a user interface operated by the selected SME 808. Such a request may, for instance, indicate the task, trajectory, actions, etc. In turn, the selected SME 808 may provide an answer 814 that is sent back to system user 802. In addition, the system may also capture information regarding the input from the selected SME 808 in a knowledge database 810, which can be leveraged by troubleshooting agent 602 and/or other components, so as to learn over time how an SME would handle a particular situation, thereby improving the performance of the system.

Figure 9:
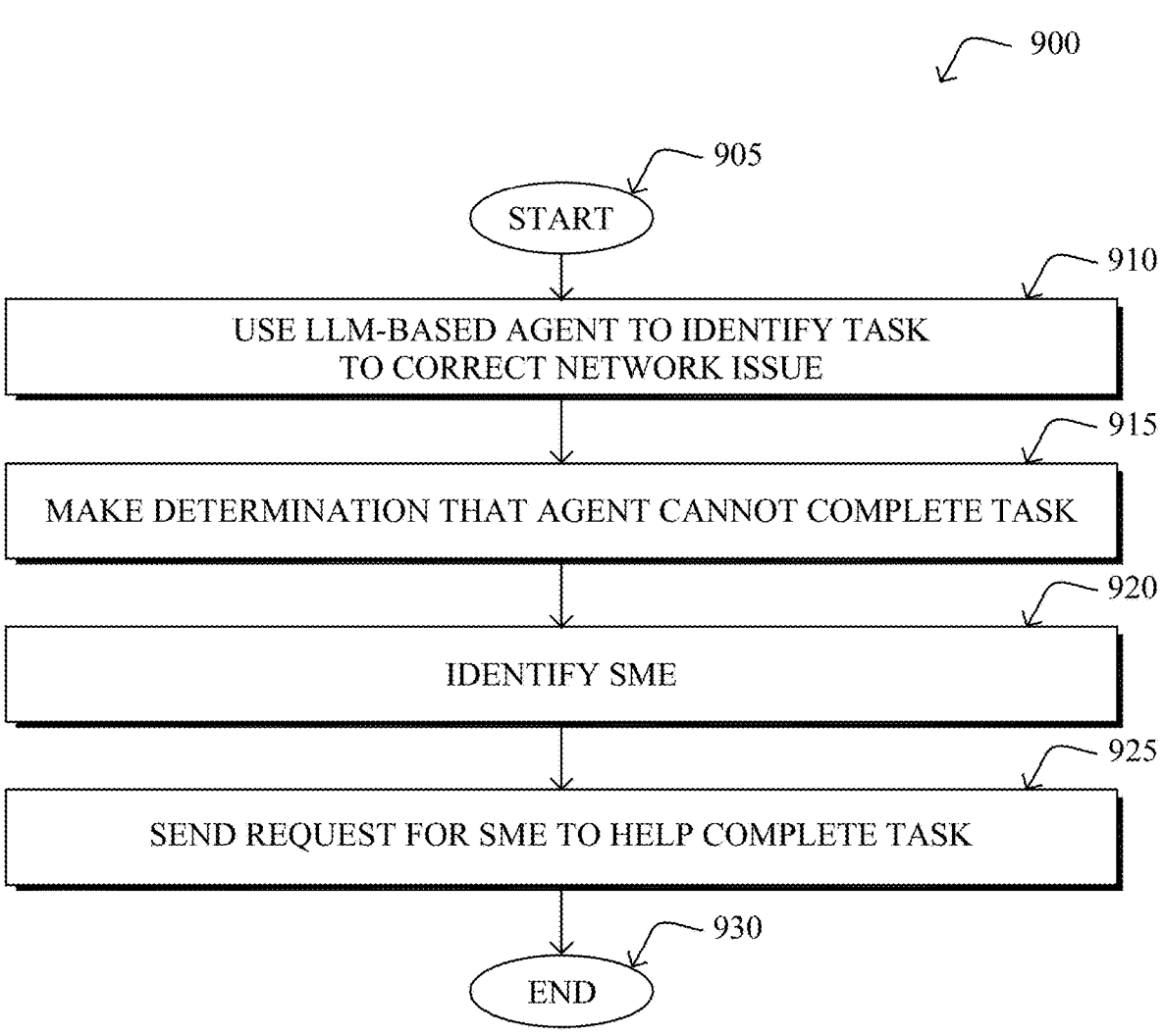
FIG. 9 illustrates an example simplified procedure for AI-based network troubleshooting with expert feedback.

FIG. 9 illustrates an example simplified procedure (e.g., a method) for AI-based network troubleshooting with expert feedback, in accordance with one or more implementations described herein. For example, a non-generic, specifically configured device (e.g., device 200), such as a router, firewall, controller for a network (e.g., an SDN controller or other device in communication therewith), server, or the like, may perform procedure 900 by executing stored instructions (e.g., language model process 249 and/or network control process 248). The procedure 900 may start at step 905, and continues to step 910, where, as described in greater detail above, the device may use a large language model-based agent to identify a task to correct an issue in a network.

At step 915, as detailed above, the device may make a determination that the large language model-based agent cannot complete the task. In some instances, the device may also assign a measure of criticality to the task and make the determination that the large language model-based agent cannot complete the task based in part on the measure of criticality. In one implementation, the large language model-based agent cannot complete the task due to the large language model-based agent exceeding a budget to perform the task. In another implementation, the large language model-based agent cannot complete the task because a resource associated with the task is unavailable. In a further implementation, the large language model-based agent cannot complete the task within a defined amount of time.

At step 920, the device may identify, based on the determination, a subject matter expert to help complete the task, as described in greater detail above. In various implementations, the device identifies the subject matter expert by performing a search of a directory of subject matter experts using a category type associated with the issue.

At step 925, as detailed above, the device may send a request to the subject matter expert to complete the task. In some instances, the request indicates one or more actions to perform the task. In further cases, the request also indicates a percentage of time the one or more actions successfully addressed the issue. In some implementations, the device also receives an indication that the subject matter expert has deemed one or more actions in the request invalid. In turn, the device may also prune the one or more actions deemed invalid from actions that the large language model-based agent identifies to address the issue.

Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for AI-based network trouble-shooting with expert feedback, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:
using, by a device, a large language model-based agent to identify a task to correct an issue in a network, wherein the large language model-based agent interfaces with a network controller to cause execution of actions performed on the network to troubleshoot the issue;
making, by the device, a determination that the large language model-based agent cannot complete the task;
identifying, by the device and based on the determination, a subject matter expert to help complete the task; and
sending, by the device, a request, including the actions, to the subject matter expert to complete the task.

2. The method as in claim 1, further comprising:
assigning, by the device, a measure of criticality to the task, wherein the device makes the determination that the large language model-based agent cannot complete the task based in part on the measure of criticality.

3. The method as in claim 1, further comprising:
adjusting, by the device, retrieval weights associated with actions deemed invalid by the subject matter expert, wherein the retrieval weights affect subsequent retrieval by the large language model-based agent.

4. The method as in claim 1, wherein the request further indicates a percentage of time the actions successfully addressed the issue.

5. The method as in claim 1, wherein the device identifies the subject matter expert by performing a search of a directory of subject matter experts using a category type associated with the issue.

6. The method as in claim 1, further comprising:
receiving an indication that the subject matter expert has deemed one or more actions in the request invalid.

7. The method as in claim 6, further comprising:
pruning the one or more actions deemed invalid from actions that the large language model-based agent identifies to address the issue.

8. The method as in claim 1, wherein the large language model-based agent cannot complete the task due to the large language model-based agent exceeding a budget to perform the task.

9. The method as in claim 1, wherein the large language model-based agent cannot complete the task because a resource associated with the task is unavailable.

10. The method as in claim 1, wherein the large language model-based agent cannot complete the task within a defined amount of time.

11. An apparatus, comprising:
one or more network interfaces;
a processor coupled to the one or more network interfaces and configured to execute one or more processes; and
a memory configured to store a process that is executable by the processor, the process when executed configured to:
use a large language model-based agent to identify a task to correct an issue in a network, wherein the large language model-based agent interfaces with a network controller to cause execution of actions performed on the network to troubleshoot the issue;
make a determination that the large language model-based agent cannot complete the task;
identify, based on the determination, a subject matter expert to help complete the task; and
send a request, including the actions, to the subject matter expert to complete the task.

12. The apparatus as in claim 11, wherein the process when executed is further configured to:
assign a measure of criticality to the task, wherein the apparatus makes the determination that the large language model-based agent cannot complete the task based in part on the measure of criticality.

13. The apparatus as in claim 11, further comprising:
adjusting retrieval weights associated with actions deemed invalid by the subject matter expert, wherein the retrieval weights affect subsequent retrieval by the large language model-based agent.

14. The apparatus as in claim 11, wherein the request further indicates a percentage of time the actions successfully addressed the issue.

15. The apparatus as in claim 11, wherein the apparatus identifies the subject matter expert by performing a search of a directory of subject matter experts using a category type associated with the issue.

16. The apparatus as in claim 11, wherein the process when executed is further configured to:
receive an indication that the subject matter expert has deemed one or more actions in the request invalid.

17. The apparatus as in claim 16, wherein the process when executed is further configured to:
prune the one or more actions deemed invalid from actions that the large language model-based agent identifies to address the issue.

18. The apparatus as in claim 11, wherein the large language model-based agent cannot complete the task due to the large language model-based agent exceeding a budget to perform the task.

19. The apparatus as in claim 11, wherein the large language model-based agent cannot complete the task because a resource associated with the task is unavailable.

20. A tangible, non-transitory, computer-readable medium storing program instructions that cause a device to execute a process comprising:

using, by the device, a large language model-based agent to identify a task to correct an issue in a network, wherein the large language model-based agent interfaces with a network controller to cause execution of actions performed on the network to troubleshoot the issue;

making, by the device, a determination that the large language model-based agent cannot complete the task;

identifying, by the device and based on the determination, a subject matter expert to help complete the task; and sending, by the device, a request, including the actions, to the subject matter expert to complete the task.

* * * * *